United States Patent
Gierman

(10) Patent No.: US 11,795,007 B1
(45) Date of Patent: Oct. 24, 2023

(54) VERTICALLY ACTUATED CASE TURNING DEVICE AND METHOD

(71) Applicant: Columbia Machine, Inc., Vancouver, WA (US)

(72) Inventor: Josh Justin Gierman, Vancouver, WA (US)

(73) Assignee: Columbia Machine, Inc., Vancouver, WA (US)

( * ) Notice: Subject to any disclaimer, the term of this patent is extended or adjusted under 35 U.S.C. 154(b) by 0 days.

(21) Appl. No.: 17/879,492

(22) Filed: Aug. 2, 2022

(51) Int. Cl.
| | |
|---|---|
| *B65G 47/244* | (2006.01) |
| *B65G 47/82* | (2006.01) |
| *B65G 47/252* | (2006.01) |

(52) U.S. Cl.
CPC ......... *B65G 47/244* (2013.01); *B65G 47/252* (2013.01); *B65G 47/82* (2013.01); *B65G 2201/025* (2013.01)

(58) Field of Classification Search
CPC .... B65G 47/252; B65G 47/244; B65G 47/82; B65G 2201/025
USPC ........................................ 198/413, 414, 416
See application file for complete search history.

(56) References Cited

U.S. PATENT DOCUMENTS

| | | | | |
|---|---|---|---|---|
| 4,106,647 A | * | 8/1978 | Robert | B65G 47/252 414/754 |
| 4,491,214 A | * | 1/1985 | Malivoir | B65G 57/081 198/374 |
| 7,703,596 B1 | * | 4/2010 | Grollitsch | B65G 47/252 198/395 |
| 10,815,072 B1 | * | 10/2020 | Gierman | B65G 47/244 |
| 2011/0106293 A1 | * | 5/2011 | Croghan | B65G 47/252 414/758 |
| 2011/0176897 A1 | * | 7/2011 | England | B65G 47/252 198/411 |
| 2012/0298481 A1 | * | 11/2012 | Fourney | B65G 39/00 198/413 |

FOREIGN PATENT DOCUMENTS

EP    3326939    *    5/2018    ........... B65G 47/244

\* cited by examiner

*Primary Examiner* — James R Bidwell
(74) *Attorney, Agent, or Firm* — Schaffer IP Law, LLC

(57) ABSTRACT

A turning assembly includes four arms extending from a central position located just outside of the expanse of conveyor rollers, with each of the arms being arranged at 90 degree angles relative to adjacent ones of the four arms. A vertical actuator is configured to move the turning assembly between an active position above a level of the conveyor rollers and an inactive position at or below the level of the conveyor rollers, where at least one of the arms is received within at least one of the gaps between adjacent rollers on the conveyor. Finally, a rotational actuator is configured to rotate the turning assembly arms through an arc around the central position, whereby articles traveling along an article path on the conveyor are configured to either pass over at least one of the turning assembly arms or impact upon the at least one of the turning assembly arms depending upon whether the turning assembly is in an inactive or active position, respectively.

20 Claims, 9 Drawing Sheets

VERTICALLY ACTUATED CASE TURNING DEVICE AND METHOD

BACKGROUND OF THE INVENTION

1. Field of the Invention

The present invention relates to palletizers and, more particularly, to an assembly and method used to turn articles, such as cartons, on conveyors so that such articles are in a proper orientation for stacking and transportation on pallets.

2. Description of the Prior Art

In the field of palletizing, turn devices are often integrated into conveyor systems so that articles (e.g. boxes) can be turned to the proper orientation according to a desired palletizing pattern. For instance, a single layer of boxes on a pallet may require that the first two boxes be placed side-by-side along their long axis while the next two boxes placed adjacent the first two boxes but along their short axis. If all boxes are initially placed on the conveyor such that they move along their long axis, then this would require that two of the boxes be rotated ninety degrees as they pass along the conveyor. Turn devices ensure that such turns are implemented.

Conveyor systems and palletizers are constructed to quickly move products from an upstream location to a palletizer section in which the product is arranged and stacked in layers for packaging and transport. There are various patterns of stacking that improve the stability of the load on the pallet. For instance, when stacking rectangular cases of consumer goods or bags of various material, the first layer of cases are arranged lengthwise along the back of the pallet and a row of cases are arranged sideways along the front of the pallet. In the next layer, the arrangement is reversed so that the back of the pallet has cases arranged sideways and the front has cases arranged lengthwise. This pattern of alternating layers is repeated until the pallet is fully loaded and the load wrapped for transport.

Pattern formation requires that the cases be properly positioned at the appropriate x-y location on the layer and in the needed orientation. This pattern formation is complicated by the fact that there may be many such patterns required for various goods and that variations in case sizes may require customized configuration of the palletizing equipment. That is, while conveyors are typically linear and have a single lane along which goods pass, cases within a palletized layer would have to be laterally positioned differently from adjacent cases. This may require lateral movement of the downstream end of the single-lane conveyor or, alternately, movement of the case to a fixed lateral lane along a multilayer conveyor. Such cases, however, would still need to be turned in order to properly orient the cases within the pallet layer.

Stacking with alternate rows improves the stability of the pallet because seams are overlaid and the cases contact multiple cases on adjacent layers. This in contrast with stacking using the same pattern where each case is in a single uniform column of such cases that are not stabilized by overlapping and thus stand a greater chance of collapsing.

One problem with stacking with alternating layers is that the orientation of the cases must be necessarily turned so that the product can be placed in either lengthwise or sideways fashion on the pallet. While such turning had been done manually, more modern equipment turn product using automated turners such as U.S. Pat. No. 6,032,782, owned in common by the assignee of the present invention. The turners operate by driving the product against a turning surface that is off axis to the direction of movement of the product along the conveyor. This causes the product to pivot around the turning surface so that it rotates exactly ninety degrees. Such turners are typically static, and pattern formation is limited to a particular preset pattern rather than dynamic as might be required when stacking products of different sizes or configurations.

Even more important problem arises when the products within the cases are particularly fragile. In the packaging industry, there is a push to reduce product packaging and this often results in less protection for the product. Such trends also often require that the conveyor and palletizer system be capable of handling a larger variety of cases or packages. Companies that previously placed their finished product into corrugated boxes, for example, are now opting to place the product into a small tray to loosely contain the product. These companies may also only use shrink film with no separation between fragile products. These impact sensitivities are combined with an increasing requirement to handle multiple case sizes on a single product conveyor line while also keeping maximum throughput at minimum cost.

Other challenges within the palletizing industry include dealing with packages that are differently weighted and thus impact with different forces on the turner, require turning of the article to a specific orientation that is not orthogonal, and/or are contained in boxes that are much longer than they are wide. For differently weighted packages, improperly designed turning mechanisms can cause product breakage. For non-orthogonal turning, precise control of the turning surface is required. And longer boxes may have trouble turning with "bump"-style turners and thus impact the speed at which the palletizer operates.

Finally, bump-style turners have an inherent disadvantage in that they rely on forward momentum created by the conveyor system to enact the turn around an off-axis stationary surface. Such turns are slow and create a back-up on the conveyor system that affect throughput of the entire palletizer system. Palletizers with active turning surfaces that push or pull the articles into a new orientation also have their drawbacks in that these turning surfaces are slow to be moved into and out of position above the conveyor surface—often either being lowered from above into an active turning position, or moving into the conveyor field from the side. Again, such movements are slow and thus affect the ability of the turning system to effect a high-speed throughput.

Accordingly, the need arises for a turning device design that is better capable of addressing these challenges while minimizing drawbacks of existing prior art solutions.

SUMMARY OF THE INVENTION

One aspect of the invention comprises an assembly for turning articles traveling on a conveyor of a type having rollers arranged in a spaced-apart orientation from an upstream end to a downstream end. The assembly comprises a first turning assembly arm having a leading blade extending into an article path along the conveyor that is vertically aligned with a downstream gap between a first roller and an adjacent downstream roller. The first turning assembly arm also includes a trailing blade parallel to, but spaced from, the leading blade and vertically aligned with an upstream gap between the first roller and an adjacent upstream roller. The assembly further comprises a vertical actuator for moving the first turning assembly arm between an active position above a level of the conveyor rollers and an inactive position at or below the level of the conveyor rollers whereby the leading blade is interposed within the downstream gap and the trailing blade is interposed within the upstream gap. A rotational actuator is configured to rotate the first turning assembly arm through an arc around a rotational axis spaced just outside of the conveyor rollers, whereby articles traveling along the article path on the conveyor are configured to either pass over the first turning assembly arm or impact upon the trailing blade depending upon whether the first turning assembly arm is in an inactive or active position, respectively.

Another aspect of the invention comprises an assembly for turning articles traveling on a conveyor of a type having an expanse of rollers arranged in a spaced-apart orientation from an upstream end to a downstream end so as to form gaps between adjacent rollers. The assembly comprises a turning assembly having four arms extending from a central position located just outside of the expanse of conveyor rollers, with each of the arms being arranged at 90 degree angles relative to adjacent ones of the four arms. A vertical actuator is configured to move the turning assembly between an active position above a level of the conveyor rollers and an inactive position at or below the level of the conveyor rollers where at least one of the arms is received within at least one of the gaps between adjacent rollers. Finally, a rotational actuator is configured to rotate the turning assembly arms through an arc around the central position, whereby articles traveling along an article path on the conveyor are configured to either pass over at least one of the turning assembly arms or impact upon at least one of the turning assembly arms depending upon whether the turning assembly is in an inactive or active position, respectively.

Yet another aspect of the invention is a method for turning an article traveling on a conveyor, comprising the steps of raising a first turning arm from within a gap between adjacent rollers on the conveyor to interpose the first turning arm into an article path along the conveyor. The article is received against the first turning arm as the article travels along the article path of the conveyor. The first turning arm is then rotated on an axis of rotation just outside the rollers so that the article rotates along the conveyor with and moves past the first turning arm. The first turning arm is then returned to a home position and then lowered into the gap between adjacent rollers so that articles can pass over the first turning arm on the rollers.

The foregoing and other objects, features and advantages of the invention will become more readily apparent from the following detailed description of a preferred embodiment of the invention that proceeds with reference to the accompanying drawings.

DETAILED DESCRIPTION

Figure 1:
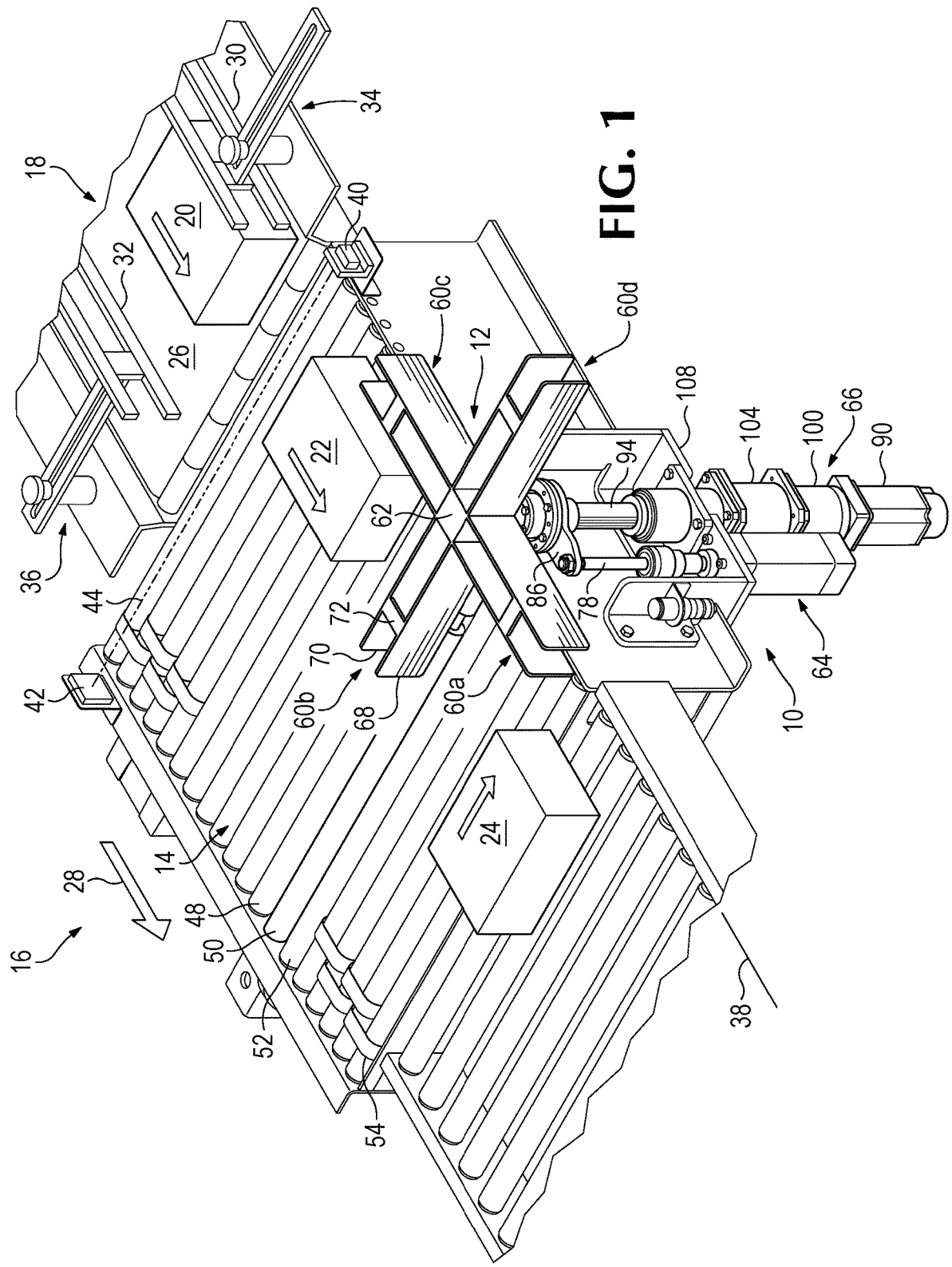
FIG. 1 is a perspective view of a conveyor with case turning device of the present invention in an active/up position.
Figure 2:
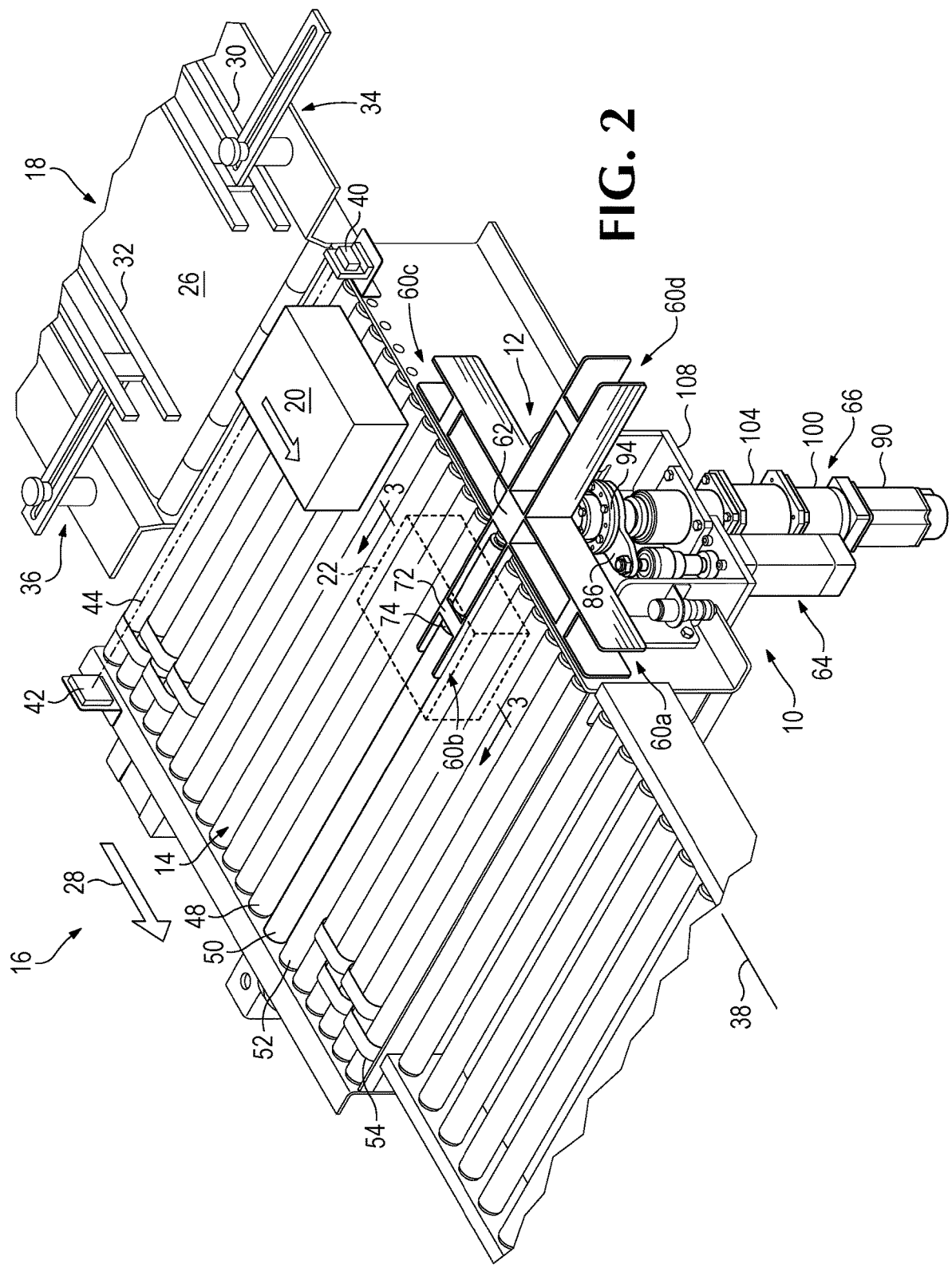
FIG. 2 is a perspective view of the conveyor of FIG. 1 with the case turning device of the present invention in an inactive/down position.

FIG. 1 shows a turning assembly 10 configured according to teachings of the invention, with its rotating upper star portion 12 raised to an active position above a transport surface 14 of roller conveyor assembly 16. FIG. 2 shows turning assembly 10 upper star portion 12 lowered to an inactive position at or below the transport surface 14 of the roller conveyor assembly 16. An in-feed conveyor 18 is located upstream of roller conveyor assembly 16 to deliver articles, such as rectangular boxes 20, 22, 24, to the downstream roller conveyor 16 whereby the box may be turned by turning assembly 10 as described in detail further below. Whereas boxes 20 and 22 are shown with their long axis parallel to the direction of movement 28 along the conveyor 16, downstream box 24 is shown turned 90 degrees so that its long axis is orthogonal to the direction of movement 28.

In-feed conveyor 18 is shown with a powered conveyor belt 26 to move articles downstream (arrow 28). Two rails 30, 32 are positioned along the length of the conveyor belt 26 so that the box 20 is laterally retained between the rails 30, 32. The rails 30, 32 may each be moved inwardly via adjustment blocks 34, 36, respectively, to further constrain the lateral movement of the box along the conveyor belt 26. Preferably, one of the rails 30 is aligned with an edge 38 of the downstream conveyor assembly 16, and the other rail 32 is positioned so that any box 20 moving along it will at least impact upon an arm of the rotating upper star portion 12 of turning assembly 10.

An article detector can be placed on an upstream end of roller conveyor assembly 16 to trigger a timer for rotating upper star portion 12 through an arc. In one embodiment, a photoeye emitter/detector 40 and reflector 42 are included on lateral sides of an upstream end of roller conveyor assembly 16. Articles moving downstream 28 from in-feed conveyor 18—such as boxes 20, 22, 24—break the beam 44 sensed by the detector and trigger a timer to begin a countdown in a programmable logic controller (PLC) 46 (see FIG. 6). Each case size/type will have a specific delay time after photoeye 42 is blocked. The turner assembly 10 will wait that time, then begin the turning profile based on that case as described in the various embodiments below.

Roller conveyor assembly 16 is of a type having a plurality of rollers—e.g. rollers 48, 50, and 52—arranged laterally in a spaced-apart orientation to a direction of movement 28 of the articles from an upstream end to a downstream end. The rollers on the conveyor assembly are powered by a motor 53 (FIG. 7A) and configured to rotate in common direction and rate via a V-belt (not shown) that presses against the bottom of the rollers so that articles moving on the rollers are moved downstream along the conveyor at a constant speed. Linking belts, e.g. belt 54, can be included to ensure drive of the rollers as a backup where the V-belt is not in contact. Alternate drive methods include linking toothed belts, or poly-v belts. As will be appreciated further below, each of the rollers 48, 50, 52 are spaced from adjacent rollers via gaps into which portions of the upper star portion 12 of turning assembly 10 retract. The gaps may be differentiated based on their location along the conveyor so that, as shown in FIG. 3, the gap 56 between adjacent rollers 48 and 50 (and between adjacent rollers 50 and 52) may be larger than a gap 58 between roller 48 and an adjacent roller on its opposite side.

The upper star portion 12 of turning assembly 10 is configured with four arms 60a, 60b, 60c, and 60d extending from a central portion 62 located just outside of the expanse of conveyor rollers, e.g. outside the conveyor edge 38. Each of the arms 60 are arranged at a 90 degree angle relative to adjacent ones so that at any one time at least one arm—here arm 60b—extends into or above the expanse of conveyor rollers. A vertical actuator 64 of turning assembly 10 is coupled to an underside of upper star portion 12 and acts to raise portion 12 to an active position as shown in FIG. 1, or lowers it to an inactive position at or below the level of the rollers as shown in FIG. 2. A rotational actuator 66 is coupled to the vertical actuator 64 and is operative to rotate the turning assembly arms 60 through an arc around the central position 62. In FIG. 1, box 24 is shown in a turned position with its long axis orthogonal to its direction of movement 28. As will be appreciated by details noted further below, box 24 is shown turned 90 degrees by rotating upper star portion 12 so that arm 60a—having previously been in a position shown by arm 60b in FIG. 1—rotates to its position currently shown in FIG. 1 where it is aligned with the conveyor outer edge 38. Whereas arm 60a received box 24, it is arm 60b that may have actively pushed box 24 from behind to rotate it 90 degrees. As will be appreciated through the description below, rotation can occur via pushing from the trailing arm, impact against the leading arm, or a combination of the two.

Each of the arms, e.g. arm 60b, is preferably formed with a leading blade 68 and a trailing blade 70 that is parallel to, but spaced from, leading blade 68. The leading blade 68 and trailing blade 70 are coupled together via a structural bridge 72 located along a portion of a length of the blades to provide additional rigidity between the blades and maintain them in parallel orientation even when impacted against an article. The leading blade 68 and trailing blade 70 of arm 60b are shown rotated to a position over the expanse of the conveyor assembly and extend into an article path along the conveyor. As shown in FIG. 1, arm 60b is ready to receive box 22. As shown in FIG. 2, the turning assembly 10 is retracted so that instead of being turned, box 22 passes over arm 60b without being turned and instead continues with its long axis aligned with its direction of movement 28.

Figure 3:
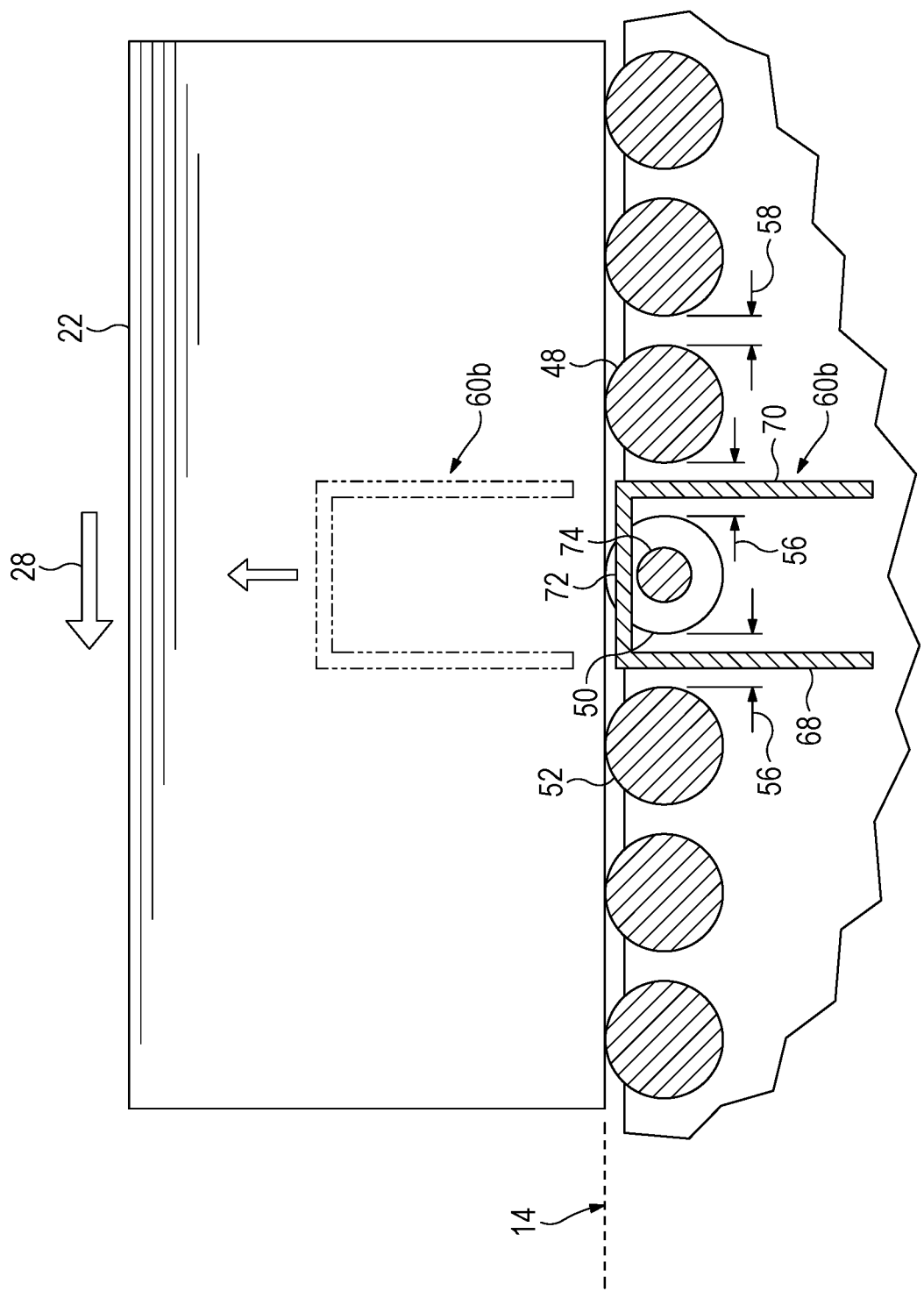
FIG. 3 is a sectional end elevation view taken along line 3-3 of FIG. 2 showing the blades of a turning arm of the case turning device retracted between rollers in the inactive/down position and, in shadow lines, above the roller surface in the active/up position.

FIG. 3 shows an edge view of arm 60b in a lowered position (solid lines) as illustrated in FIG. 2, and in a raised position (shadow lines) as illustrated in FIG. 1. Roller 50 includes a recessed portion 74 adapted to receive the structural bridge 72 when the turning assembly is lowered into its inactive position. In this lowered/inactive position, the blades 68, 70 may be fully retracted at or below the conveyor surface 14 of the rollers whereby the arm 60b is received within at least one of the gaps 56 between adjacent rollers. The trailing blade 70 is parallel but spaced from the leading blade 68 by an amount approximately equal to a distance between gaps 56 between adjacent rollers so that, when one of the arms 60b is positioned orthogonal to a direction 28 of travel of the conveyor and into the article path, the leading blade and trailing blade are capable of being lowered into gaps on either side of a single roller 50. Here, leading blade 68 of arm 60b is received within the gap 56 between rollers 50 and 52 (the "downstream gap"), and trailing blade 70 of arm 60b is received within the gap 56 between rollers 48 and 50 (the "upstream gap"). In the raised position, in contrast, the turning assembly arm 60b is suspended above the surface 14 of the conveyor so that it may interact with articles to be turned.

In general, the turning assembly 10 includes at least one arm—e.g. arm 60b—configured to extend into an operative position above the conveyor surface 14 and into an article path. A second turning assembly arm—e.g. 60a or 60c—extends from the rotational axis 62 orthogonally to the first turning assembly arm 60b and is rotatable in common with the first turning assembly arm via the rotational actuator 66. Each of the other arms 60a, 60c, and 60d preferably include leading and trailing blades that are spaced apart similarly to leading and trailing blades 68, 70 of arm 60b so that the arms form a cross-shape arrangement, with each arm orthogonal to an adjacent arm.

The conveyor 16 can be of a type having raised guides configured to maintain articles between the guides and within the expanse of the conveyor. The turning assembly is configured such that two of the opposed arms—here arms 60a, 60c—align with a near one of the guides, one of the arms 60b extends into the article path, and one of the arms 60d extends away from the article path. When an arm—e.g. arm 60b—extends orthogonally into the roller expanse as shown in FIG. 1, adjacent arms including upstream arm 60c and downstream arm 60a define borders of the conveyor assembly 16 so that the trailing blade of arm 60a and the leading blade of arm 60c are aligned with conveyor edge 38 and with each other. The axis of rotation 62 around which the arms rotate is thus approximately spaced outside of the conveyor edge 38 by a distance about half the spacing between the leading and trailing blades 68, 70 so that these blades may be properly aligned with the conveyor edge 38.

Figure 4:
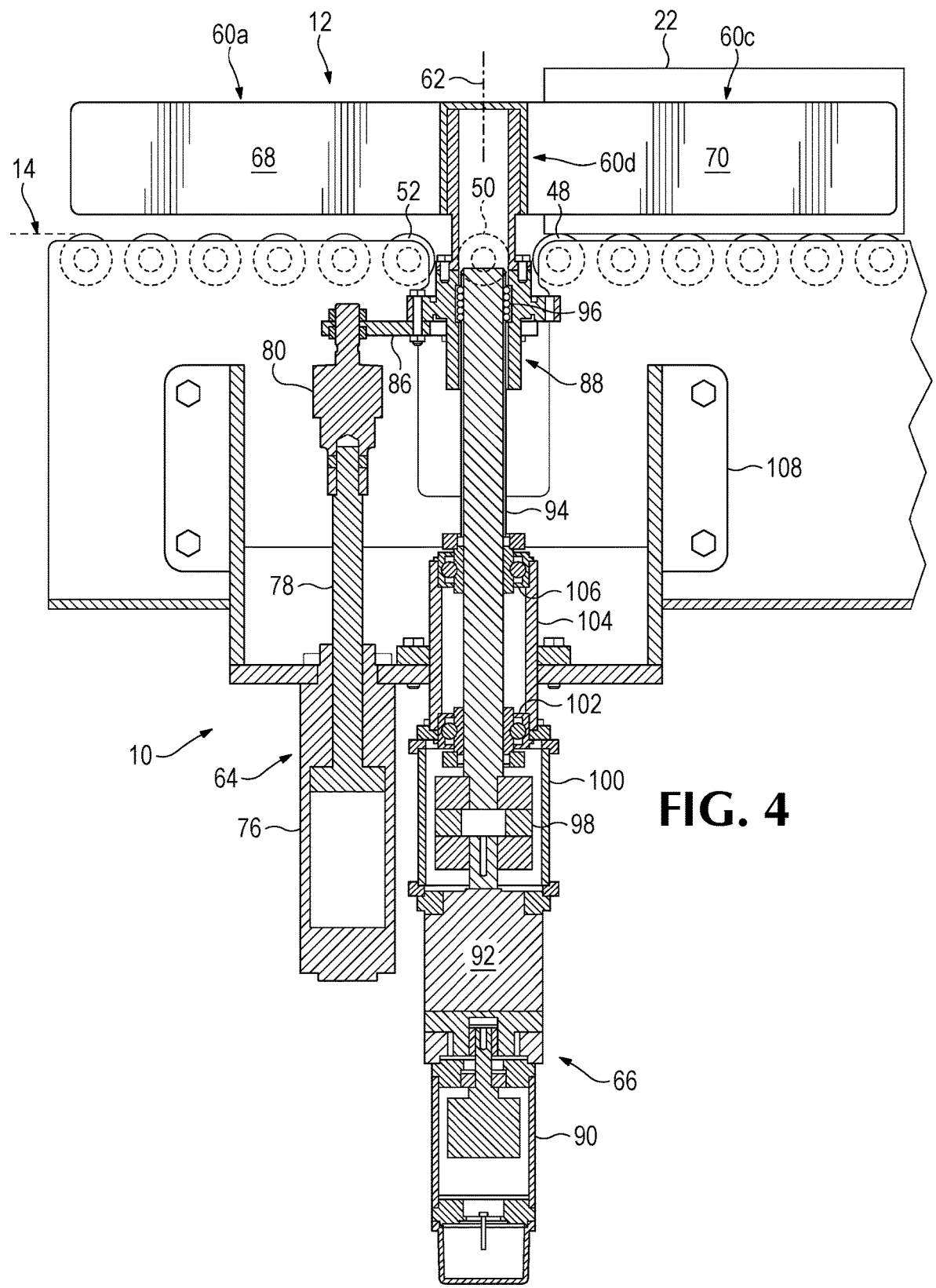
FIG. 4 is a side elevation section view of FIG. 1 showing the conveyor with case turning device in the active/up position.
Figure 5:
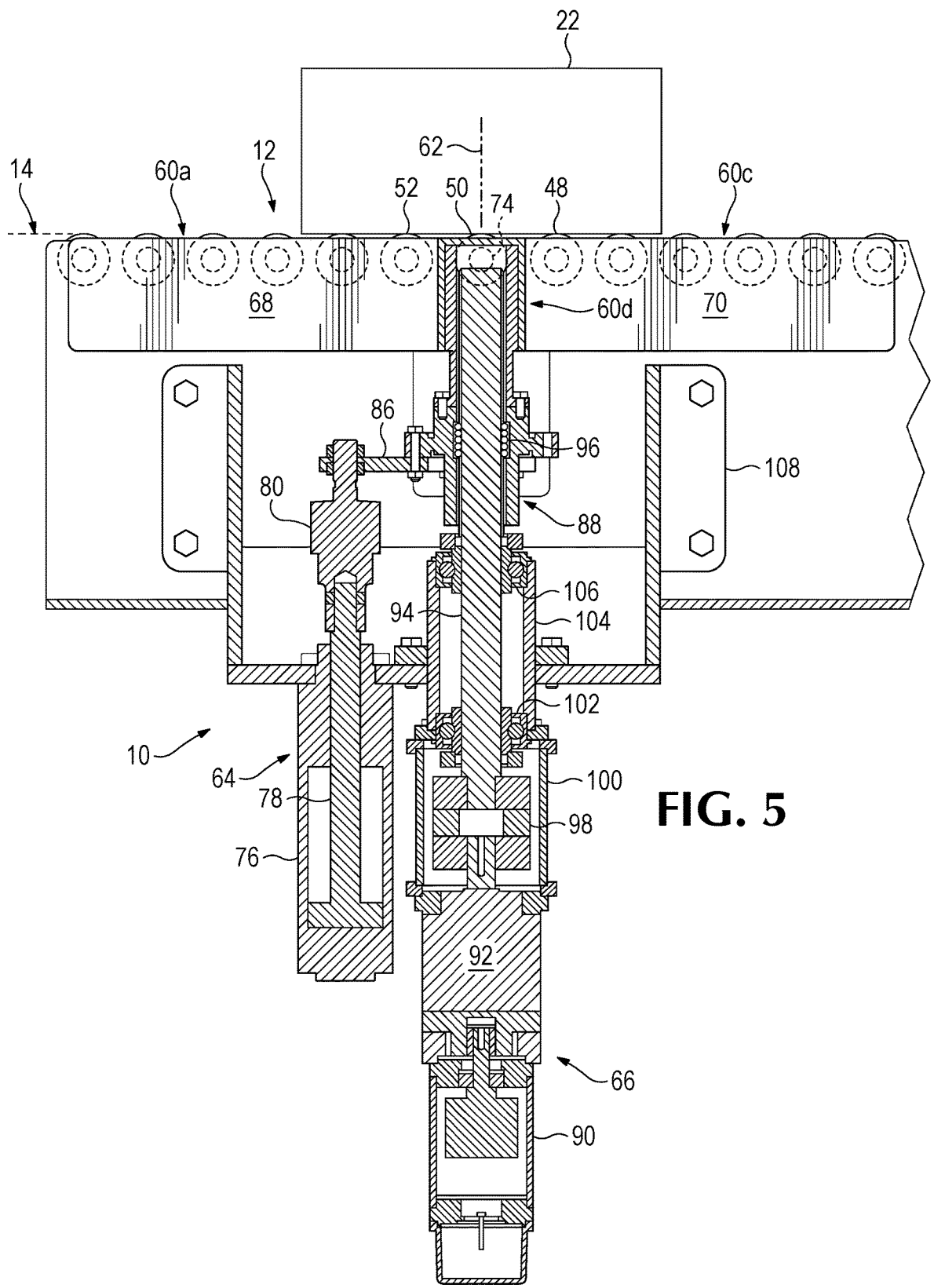
FIG. 5 is a side elevation section view of FIG. 2 showing the conveyor with case turning device in the inactive/down position.

FIGS. 4 and 5 illustrate the turning assembly 10 in a raised/active position (FIG. 4) and a lowered/inactive position (FIG. 5) as also shown in FIGS. 1 and 2, respectively. In FIG. 4, the upper star portion 12 of turning assembly 10 is raised such that the arms 60a, 60c are suspended above a level of the conveyor surface 14 but align with the lateral conveyor edge 38 as described previously.

Vertical actuator 64 includes a pneumatic cylinder 76 having a stationary lower end and lifting upper end mounted parallel to, but off-axis from, the rotational axis 62 of rotational actuator 66. A cylinder rod 78 extends vertically out of the pneumatic cylinder 76 and couples to an upper portion 80 of the vertical actuator. Activation of the pneumatic cylinder 76, as via PLC 46 operation of air valve 82 through flow control 84a, 84b (FIG. 6), causes the rod 78 to extend upward out the top of the pneumatic cylinder 76 as shown in FIG. 5. An attachment bar 86 bridges between the lifting end 80 of the pneumatic cylinder 76 and the rotational actuator 66, and is configured to lift and lower at least an upper portion 88 of the rotational actuator 66 in common with the lifting end 80 of the pneumatic cylinder 76.

Rotational actuator 66 includes a servo motor 90 coupled to a controller (e.g., PLC 46) to enable precise rotation of the rotational actuator 66. Motor 90 couples through a gearbox 92 to a splined shaft 94, which transmits rotation to the upper star portion 12 of the turning assembly 10. Operation of the motor 90 drives rotation of the shaft 94 in controlled increments (e.g. 90 degrees [FIGS. 7A-7C] or lesser [FIGS. 8A-8C]) via PLC 46 depending upon the programming of the system. For instance, and as will be understood with reference to the examples shown in FIGS. 7A-7C and FIGS. 8A-8C, trigger of the photoeye 40 by an incoming article (e.g. box 22) causes a timer signal to activate that selectively activates the lifting actuator 64 and rotational actuator 66 to lift and rotate the turning assembly 10 at the proper time and with the proper speed and rotational arc. For instance, certainly sized articles are best turned before such articles impact arm 60b that extends into the article path and instead are turned by the trailing arm (arm 60c). Timing, speed, and arc operations are often dictated by the size of the article to be turned and the fragility of its contents. An upper housing 88 is coupled to the vertical actuator 64 via attachment bar 86 and is moveable along a vertical length of the splined shaft 94 using a rotary ball spline 96, with said housing 88 being configured to bear against an underside of the star portion 12 arms 60 and lift or lower the arm between engaged (FIGS. 1 and 4) and unengaged (FIGS. 2 and 5) positions.

Other elements of the rotational actuator include jaw coupling 98, coupling housing 100, shaft support bearing 102, bearing housing 104, and the upper shaft support bearing 106. The vertical actuator 64 and rotational actuator 66 are supported on the conveyor assembly 16 via a main support weldment 108.

Figure 6:
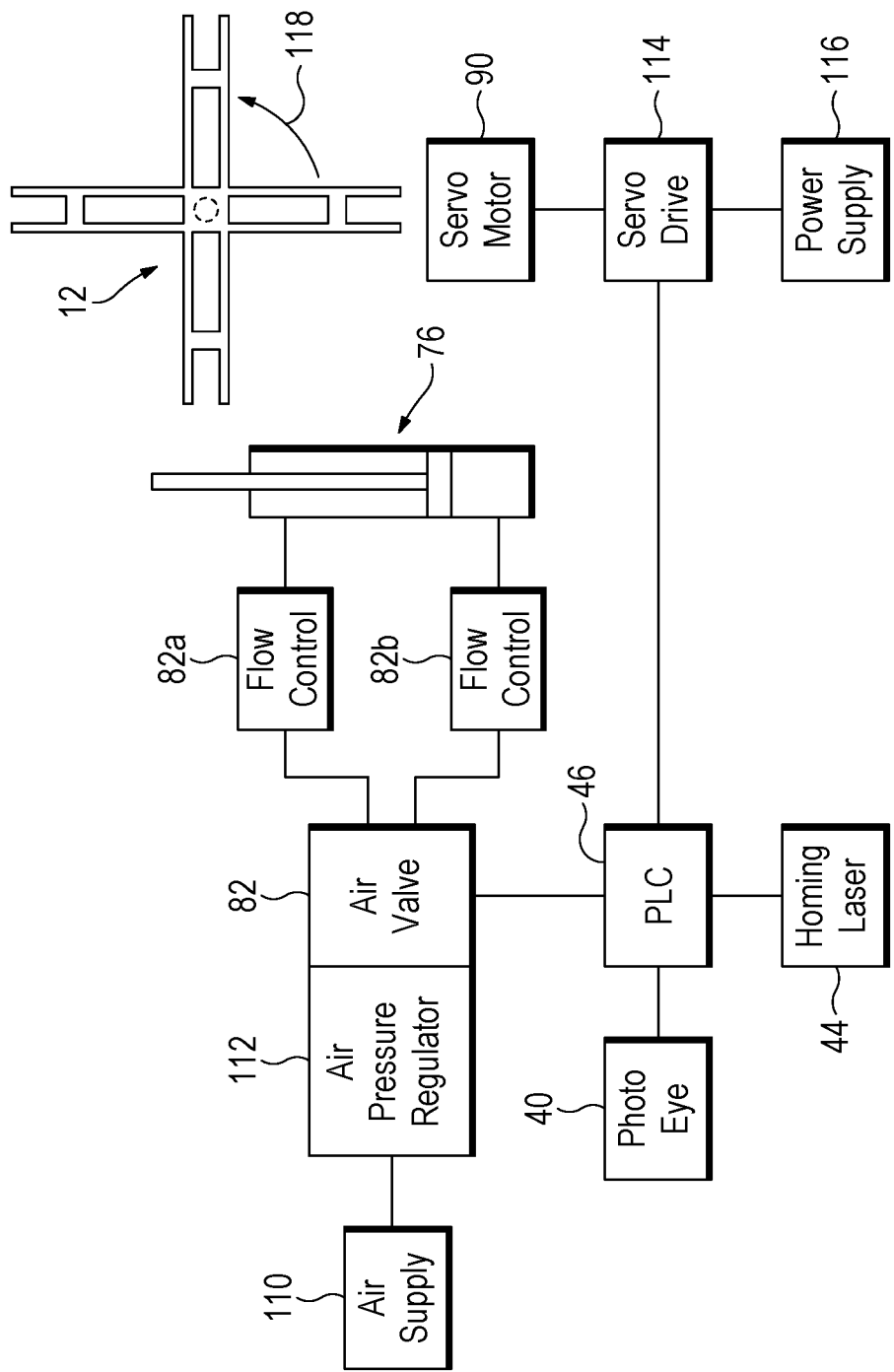
FIG. 6 is a block diagram illustrating the operational parts of the case turning device of the present invention including pneumatic and PCL control.

FIG. 6 illustrates a schematic of the control system for turning assembly 10 and will be explained in connection with the progressive operations shown in FIGS. 7A-7C and FIGS. 8A-8C. PLC 46 activates the vertical actuator 64 and rotational actuator 66, which operate to raise and lower the turning assembly 10 and rotate the turning assembly, respectively, responsive to a signal received from an upstream detector 40 triggered by passage of the article along the article path of the conveyor.

Figure 7A:
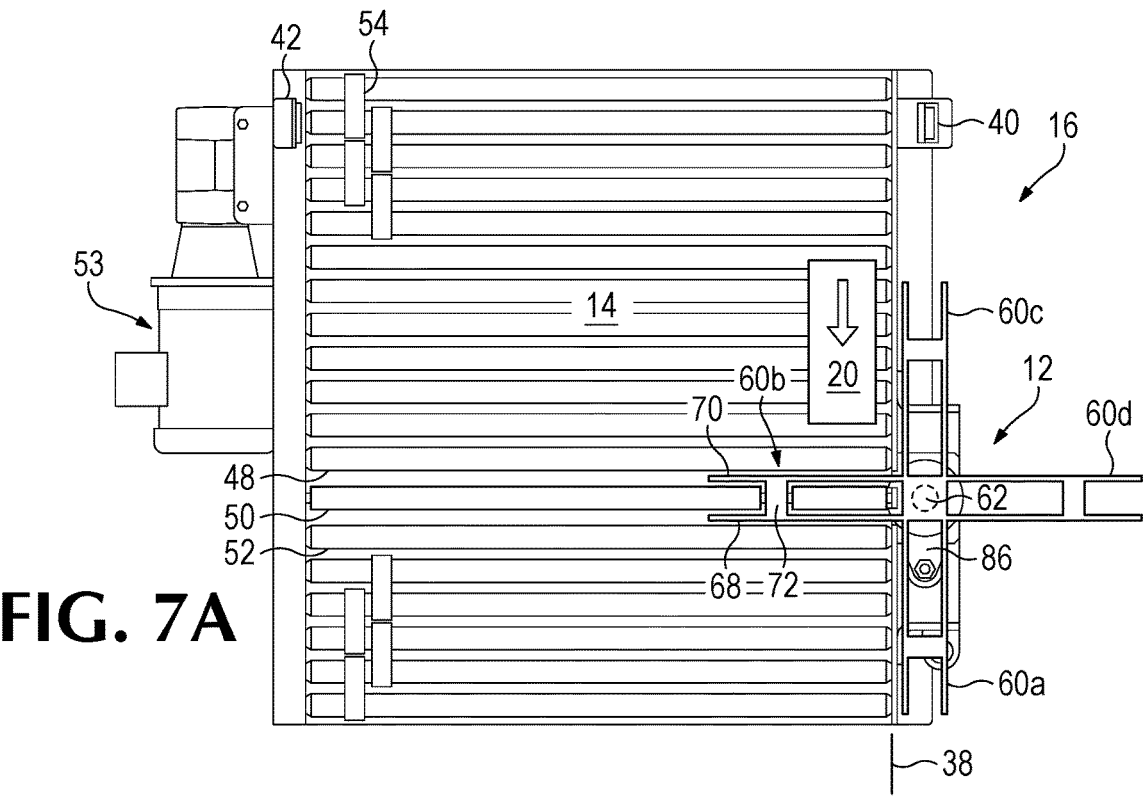
FIGS. 7A-7C are plan views of the conveyor with case turning device of FIG. 1 in three successive turning positions according to a first embodiment showing rotation of a smaller case 90 degrees on the conveyor.

FIG. 7A shows a plan view of conveyor assembly 16 implementing a turn of a smaller package, e.g. box 20. Passage of box 20 onto conveyor surface 14 from the upstream conveyor 18 (FIG. 1) is detected by box 20 interrupting the laser beam 44 that would normally be detected by photoeye 40. The PLC 46 is programmed to carry out operations based on this detection trigger. In the present instance, the PLC 46 is programmed to turn incoming box 20 by 90 degrees. More specifically, detection of the incoming box 20 triggers instructions to both raise the upper star portion 12 and then, after a programmed delay, to turn the upper star portion 12 through a rotation arc. To do this, PLC 46 first opens the air valve 82—fed by air supply 110 through air pressure regulator 112—to deliver pressurized air through flow control circuits 82a, 82b and thence to the pneumatic cylinder 76 to extend the cylinder rod and thus raise the upper star portion 12 to a raised/operative position.

The PLC 46 then begins a countdown timer based on the expected travel speed of box 20 along the conveyor, its location, size, etc. to estimate when the box 20 would reach the appropriate turning position adjacent the turning arm 60b. As noted above, in one instance it might be advisable to beginning the turning process before the box 20 impacts upon turning arm 60b, while in an alternate embodiment the turning process is programmed to begin only once the box 20 impacts upon and is stopped by the turning arm 60b. When the countdown time expires, a signal is sent to servo drive 114—powered by power supply 116—to begin operation of the servo motor 90 to turn star portion 12 in a preprogrammed arc 118, here a total of 90 degrees to effect a 90 degree turn of small box 20.

Figure 7B:
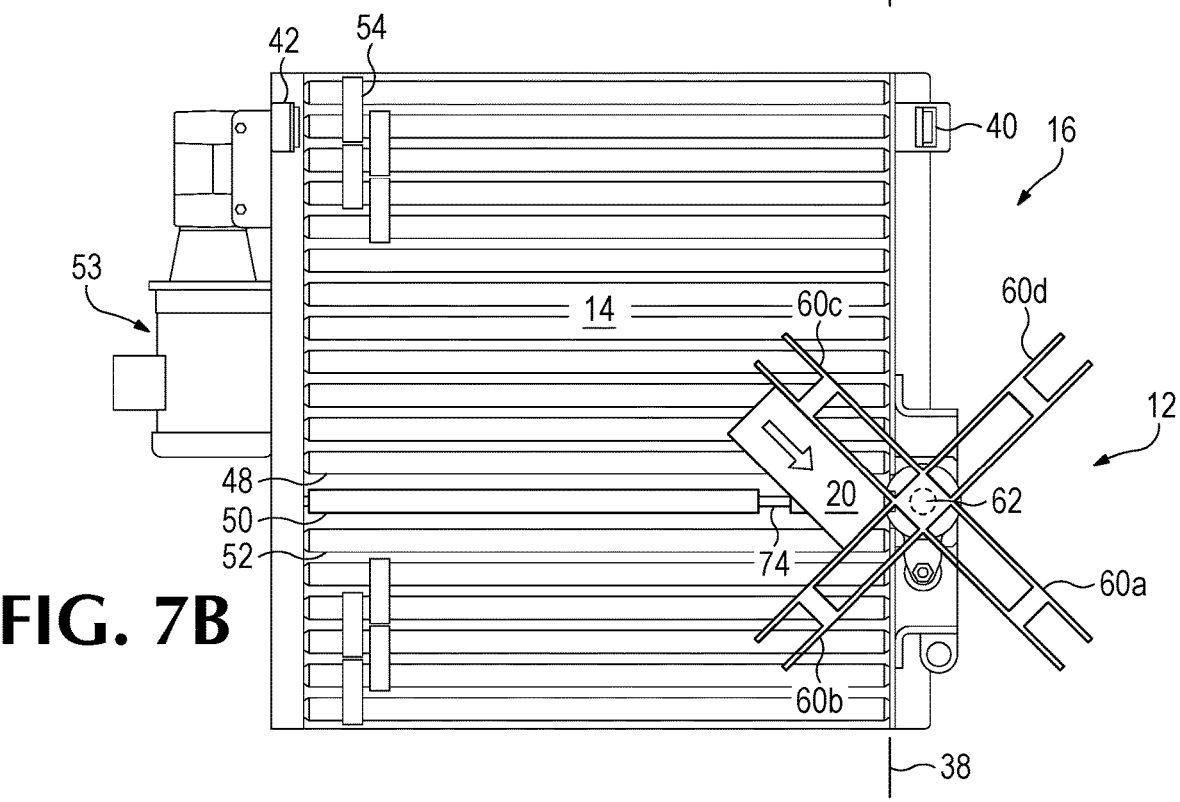
Figure 7C:
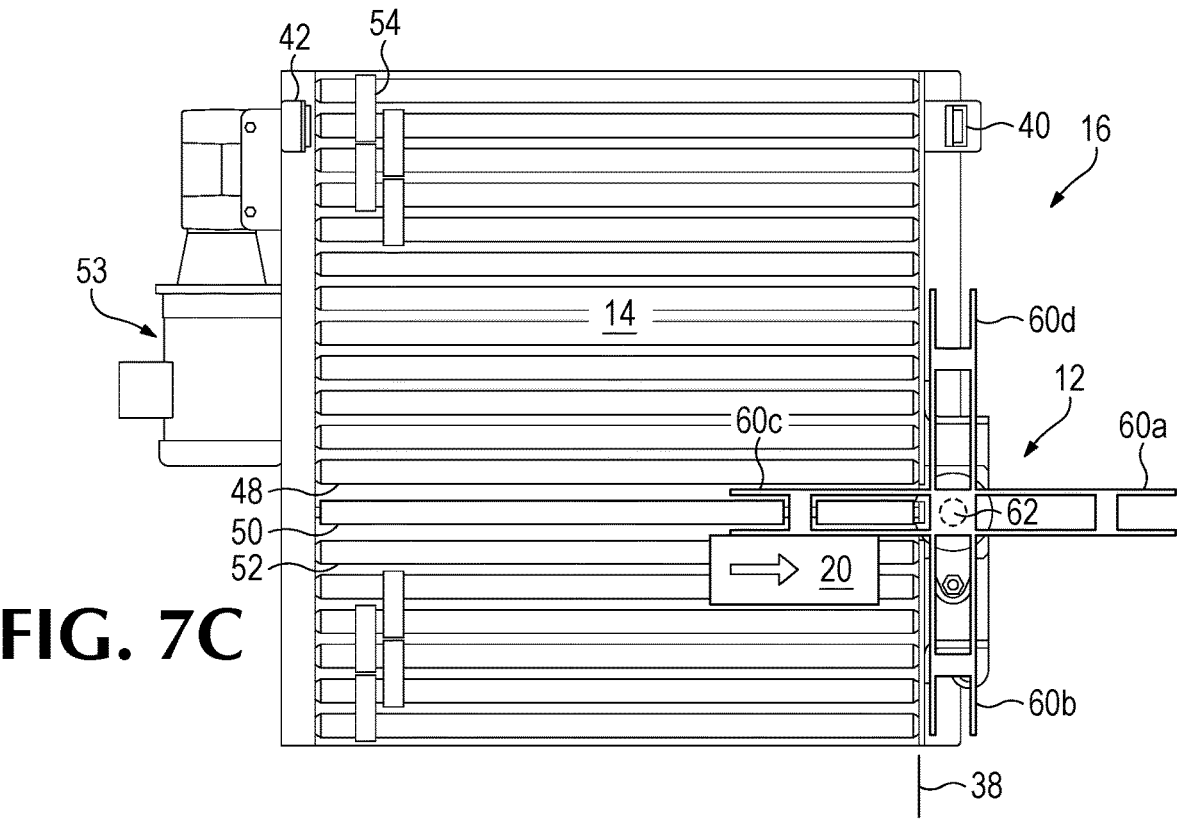

FIG. 7B illustrates a moment where the servo drive 114 is midway through turning box 20 orthogonally. The leading edge of box 20 is shown against the trailing blade 70 of arm 60, while a side edge of box 20 is shown against and pushed in an arc by trailing arm 60c. FIG. 7C shows the conveyor assembly 16 and box 20 after a completed turn of 90 degrees so that the long axis of the box is no longer parallel with the direction of its movement along the conveyor, but instead runs parallel to the long axis of the rollers 48, 50, 52. The centrifugal force of the box 20 moving along the arc 118, and the continued forward movement of the box along the powered conveyor rollers, causes the box leading edge to move away from contact with leading arm 60b so that the edge of the turned box 20 is spaced from the edge 38 of conveyor 16.

Alternately to the turning sequence shown in FIGS. 7A-7C, the stacking pattern programmed into PLC 46 might call for certain boxes to not be turned. The PLC 46 might then recognize that the palletizing pattern of boxes would require that the box 20 not be turned but instead remain with its long axis parallel to the direction of movement. In this instance, PLC 46 would deactivate air valve 82 so that the upper star portion 12 and its four arms 60a, 60b, 60c, and 60d move down into a lowered/deactivated position such as shown in FIGS. 2 and 5. Servo drive 114 would be queried as to the rotational location of star portion 12 so as to ensure that at least one of the arms, e.g. arm 60b is positioned orthogonal to the direction of conveyor travel and aligned with the roller 50 before the arms are lowered. The upper star portion 12 of turning assembly 10 would remain in the lowered position until the PLC calls for the portion to again be raised. FIGS. 2 and 5 illustrate the situation where box 22 is unturned by turning assembly 10 and instead passes over the lowered arm 60b of star portion 12.

Figure 8A:
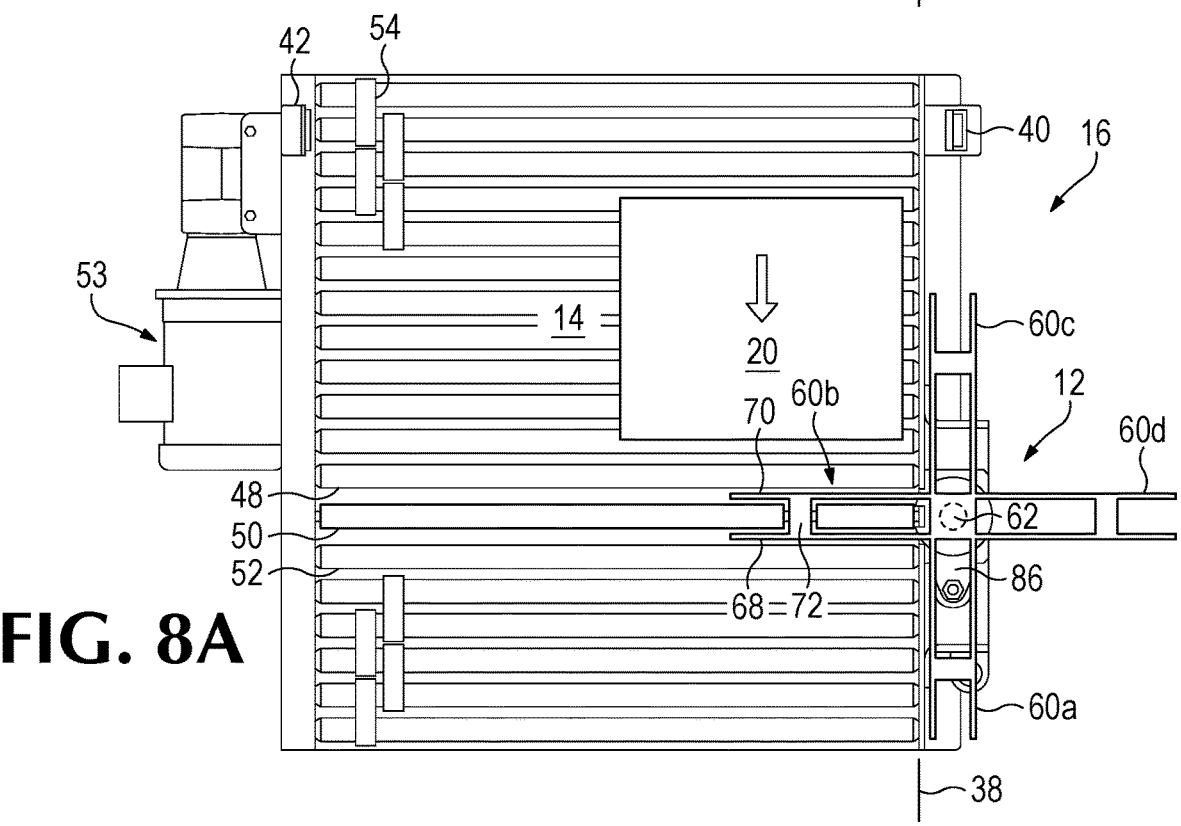
FIG. 8A-8C are plan views of the conveyor with case turning device of FIG. 1 in three successive turning positions according to a second embodiment showing rotation of a larger case 90 degrees on the conveyor.

FIG. 8A shows a plan view of conveyor assembly 16 implementing a turn of a larger package, e.g. box 20. Passage of box 20 onto conveyor surface 14 from the upstream conveyor 18 (FIG. 1) is detected by box 20 interrupting the laser beam 44 that would normally be detected by photoeye 40. The PLC 46 is programmed to carry out operations based on this detection trigger. In the present instance, the PLC 46 is programmed to turn incoming box 20 by 90 degrees. More specifically, detection of the incoming box 20 triggers instructions to both raise the upper star portion 12 and then, after a programmed delay, to turn the upper star portion 12 through a rotation arc. To do this, PLC 46 first opens the air valve 82—fed by air supply 110 through air pressure regulator 112—to deliver pressurized air through flow control circuits 82a, 82b and thence to the pneumatic cylinder 76 to extend the cylinder rod and thus raise the upper star portion 12 to a raised/operative position.

The PLC 46 then begins a countdown timer based on the expected travel speed of box 20 along the conveyor, its location, size, etc. to estimate when the box 20 would reach the appropriate turning position adjacent the turning arm 60b. As noted above, in one instance it might be advisable to beginning the turning process before the box 20 impacts upon turning arm 60b, while in an alternate embodiment the turning process is programmed to begin only once the box 20 impacts upon and is stopped by the turning arm 60b. Larger boxes may require the later situation more than the former. When the countdown time expires, a signal is sent to servo drive 114—powered by power supply 116—to begin operation of the servo motor 90 to turn star portion 12 in a preprogrammed arc 118, here a total of less than 90 degrees to effect a 90 degree partial bump turn of large box 20.

Figure 8B:
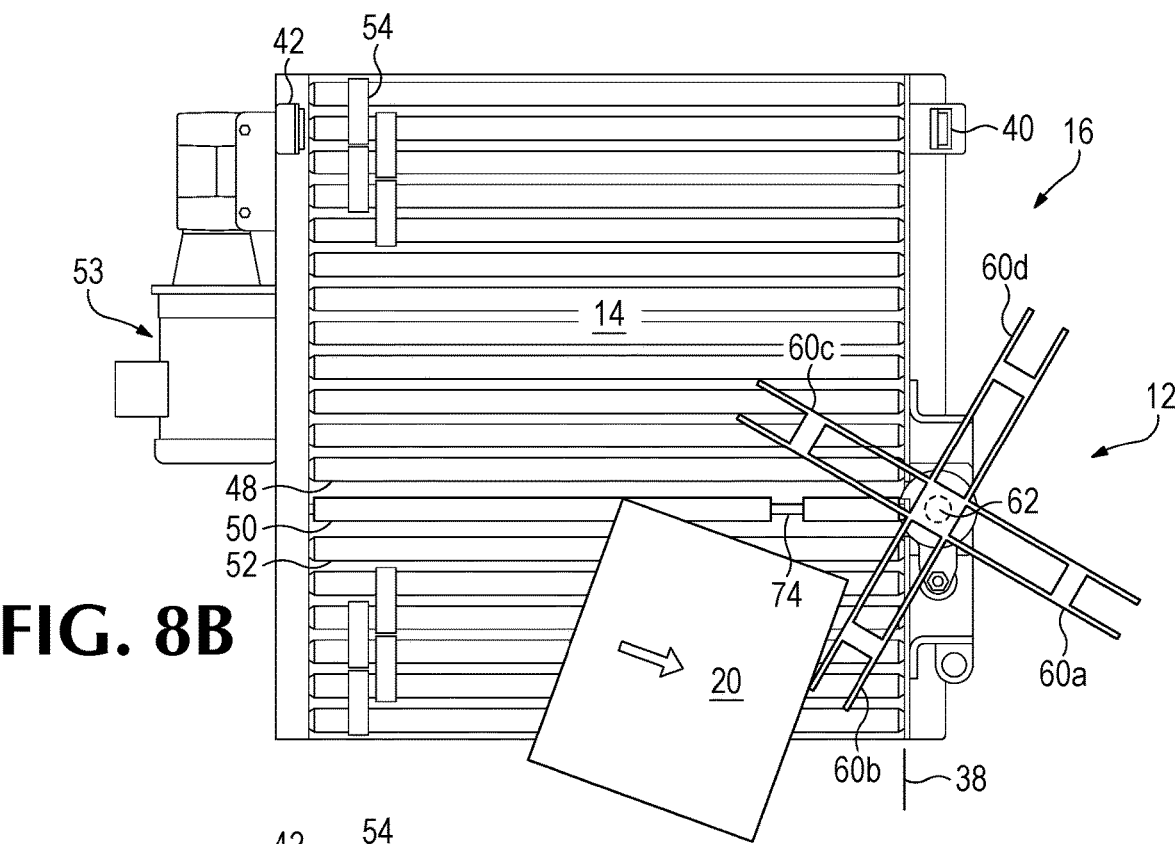

FIG. 8B illustrates a moment where the servo drive 114 is more than midway through turning box 20 orthogonally. In operation with large articles such as box 20 in FIGS. 8A-8C, it may be desirable to temporarily pause the rotation of the upper star portion 12 to a preset rotational position so that the large article may continue forward and rotate around the terminal end of trailing blade 70 on arm 60c. The box is then partially turned by action of the star portion 12, and the remainder by a "bump" turn created by pausing the rotation of star portion 12 to a certain rotational position. These rotations and timings are programmed into the PLC depending upon the size of the article, the position of the article center of gravity in relation to the terminal end of the rotating arms, as well as conveyor speed, and weight of the article.

Figure 8C:
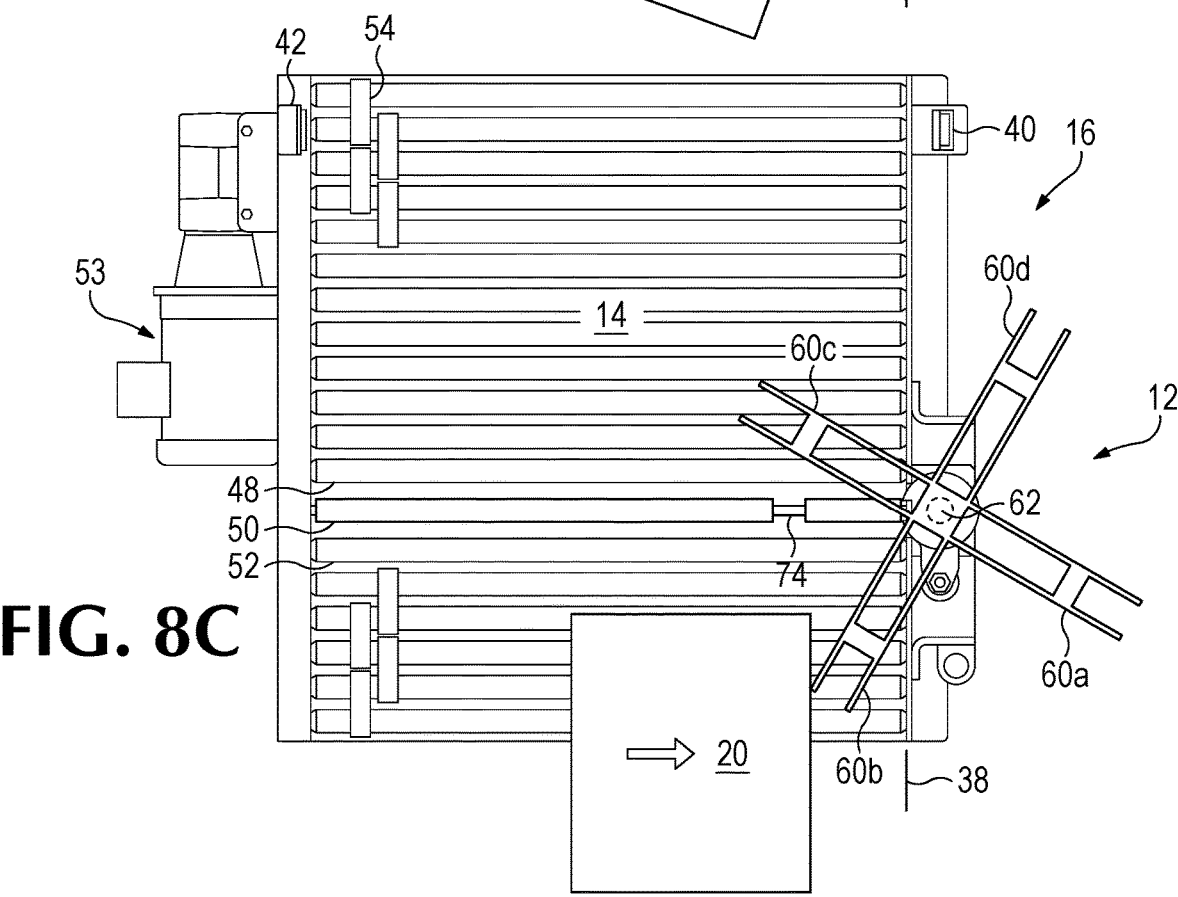

The formerly leading edge of box 20 is shown partially against the trailing blade 70 of arm 60b, while a side edge of box 20 is shown against and pushed in an arc by trailing arm 60c. FIG. 8C shows the conveyor assembly 16 and box 20 after a completed turn of 90 degrees so that the long axis of the box is no longer parallel with the direction of its movement along the conveyor, but instead runs parallel to the long axis of the rollers 48, 50, 52. The temporary stoppage of rotation of arm 60b to create the bump turn portion of the box turning sequence, and the continued forward movement of the box along the powered conveyor rollers, causes the box leading edge to move along the terminal end of blade 70, which properly spaces the larger box 20 from the edge 38 of conveyor 16.

The method for turning an article traveling on a conveyor comprises the steps of raising a first turning arm from within a gap between adjacent rollers on the conveyor to interpose the first turning arm into an article path along the conveyor. The article is received against the first turning arm as the article travels along the article path of the conveyor. The first turning arm is then rotated on an axis of rotation just outside the rollers so that the article rotates along the conveyor with and moves past the first turning arm. The first turning arm is then returned to a home position and then lowered into the gap between adjacent rollers so that articles can pass over the first turning arm on the rollers. This return to home position can be accomplished by turning the first arm clockwise in an arc opposite to its initial turning of the article or, more commonly, by continuing turn of the arm a full 360 degrees (also in multiple steps after the turning device has rotated four boxes) so that the arm returns to its position interposed into the article path above the conveyor.

Other aspects of the invention involves simultaneously turning multiple arms of the turning device, where the step of rotating the second turning arm in common with the first turning arm includes turning the first and second turning arms 90 degrees such as shown by the sequence illustrated in FIGS. 7A-7B. The step of rotating the turning arms 90 degrees enables the first turning arm to define an edge of the conveyor, whereby an orthogonal one of the remaining arms rotates into a position previously occupied by the first turning arm. The orthogonal arm, e.g. arm 60c, may then be lowered into the gap between adjacent rollers. Alternately, the method includes the steps of stopping the first turning arm after a rotation of less than 90 degrees so that the first turning arm is still interposed within the article path on the conveyor, and continuing movement of the conveyor while the first turning arm is stopped within the article path so that the article rotates around a terminal end of the first turning arm to a desired orientation such as shown by the sequence illustrated in FIGS. 8A-8C.

The inventive device is used to turn articles that are being conveyed on a roller conveyor. The upper star portion 12, connected to a servo 114, can rotate to turn articles conveyed into it. A pneumatic cylinder 76 is used to lower the star down below the conveying surface height 14 and allow articles to pass by without turning when required. The paddles or blades of the star are in pairs of two 68, 70 and are spaced apart to allow one roller (e.g. roller 50) of the conveyor to fit between them. This minimizes the gap between rollers where the star blades 68, 70 drop down. The pairs also allow the infeed and outfeed star edges to remain adjacent to the straight conveyor edge 38.

The servo allows for various turning profiles to accommodate article differences. For some articles the trailing star paddle is used to push the article through a 90 degree rotation. Larger articles may use the leading star paddle as a deflector which may include a pause in the rotation cycle to accurately control rotation angle. The use of the servo allows for other turning performance advantages. Custom turning profiles enable increased turn speeds for small articles and stability for tall narrow articles. Pauses in the turning profile can be utilized for control of larger articles.

One advantage is the short distance at which the turning device can be dropped out of the way. Past version would lift up out of the way of incoming articles to allow article pass-thru without turning. That method is less versatile because changing article heights requires different vertical travel distances. The short drop distance allows for high speed removal from article flow.

The drop-down design requires space available for the star to drop into the conveyor area, preferably into a recess, without interrupting the flow of articles or creating large gaps in the conveying surface. The dual blade design is a primary advantage by allowing a roller to fit between the two paddles; this reduces the gap between rollers improving small article handling. The dual blades also allow for a large center drive shaft while paddles remain adjacent to the conveyor edge.

Having described and illustrated the principles of the invention in a preferred embodiment thereof, it should be apparent that the invention can be modified in arrangement and detail without departing from such principles. Accordingly, we claim all modifications and variation coming within the spirit and scope of the following claims.

What is claimed is:

1. An assembly for turning articles traveling on a conveyor of a type having rollers arranged in a spaced-apart orientation from an upstream end to a downstream end, the assembly comprising:
  a first turning assembly arm having:
    a leading blade extending into an article path along the conveyor and vertically aligned with a downstream gap between a first roller and an adjacent downstream roller; and
    a trailing blade parallel but spaced from the leading blade and vertically aligned with an upstream gap between the first roller and an adjacent upstream roller;
  a vertical actuator for moving the first turning assembly arm between an active position above a level of the conveyor rollers and an inactive position at or below the level of the conveyor rollers whereby the leading blade is interposed within the downstream gap and the trailing blade is interposed within the upstream gap; and a rotational actuator for rotating the first turning assembly arm through an arc around a rotational axis spaced just outside of the conveyor rollers, whereby articles traveling along the article path on the conveyor are configured to either pass over the first turning assembly arm or impact upon the trailing blade depending upon whether the first turning assembly arm is in an inactive or active position, respectively.

2. The assembly of claim 1, further including a second turning assembly arm extending from the rotational axis orthogonally to the first turning assembly arm and rotatable in common with the first turning assembly arm via the rotational actuator.

3. The assembly of claim 2, wherein the second turning assembly arm includes:

a leading blade; and a trailing blade spaced from the leading blade the same distance as between the leading blade and trailing blade of the first turning assembly arm, wherein the trailing blade is aligned along a near border of the conveyor rollers.

4. The assembly of claim 2, wherein the second turning assembly arm includes:

a leading blade aligned along a near border of the conveyor rollers; and a trailing blade spaced from the leading blade the same distance as between the leading blade and trailing blade of the first turning assembly arm.

5. The assembly of claim 1, further including second, third, and fourth turning assembly arms arranged about the rotational axis with the first turning assembly arm to form a cross-shape arrangement with each arm orthogonal to an adjacent arm.

6. The assembly of claim 5, wherein each of the second, third, and fourth turning assembly arms includes:

a leading blade; and a trailing blade spaced from the leading blade the same distance as between the leading blade and trailing blade of the first turning assembly arm, the turning assembly arms being configured such that a 90 degree rotation of the assembly arms moves the first and third turning assembly arms parallel to a direction of movement of the conveyor and the second and fourth turning assembly arms orthogonal to the direction of movement of the conveyor, whereby the fourth turning assembly extends into the article path along the conveyor previously occupied by the first turning assembly arm so that the leading blade is vertically aligned with the downstream gap between the first roller and the adjacent downstream roller and the trailing blade is parallel but spaced from the leading blade and vertically aligned with the upstream gap between the first roller and the adjacent upstream roller.

7. The assembly of claim 1, wherein the leading blade and trailing blade are coupled together via a structural bridge located along a portion of a length of the blades, whereby one of the rollers includes a recessed portion adapted to receive the structural bridge when the turning assembly is lowered into its inactive position so that the blades may be fully retracted at or below the level of the rollers when the first turning assembly arm is in the inactive position.

8. The apparatus of claim 1, wherein the vertical actuator includes:

a pneumatic cylinder having a stationary lower end and lifting upper end mounted parallel to, but off-axis from, the rotational axis of the rotational actuator; and an attachment bar coupled between the lifting end of the pneumatic cylinder and the rotational actuator, with said attachment bar configured to lift at least an upper portion of the rotational actuator in common with the lifting end of the pneumatic cylinder.

9. The assembly of claim 1, wherein the rotational actuator includes:

a servo motor coupled to a controller to enable precise rotation of the rotational actuator;

a splined shaft coupled between the servo motor and the first turning assembly arm; and a housing coupled to the vertical actuator and moveable along a vertical length of the splined shaft using a rotary ball spline, with said housing being configured to bear against an underside of the first turning assembly arm and lifting or lowering the arm between engaged and unengaged positions.

10. An assembly for turning articles traveling on a conveyor of a type having an expanse of rollers arranged in a spaced-apart orientation from an upstream end to a downstream end so as to form gaps between adjacent rollers, the assembly comprising:

a turning assembly having four arms extending from a central position located just outside of the expanse of conveyor rollers, with each of the arms being arranged at 90 degree angles relative to adjacent ones of the four arms;

a vertical actuator for moving the turning assembly between an active position above a level of the conveyor rollers and an inactive position at or below the level of the conveyor rollers where at least one of the arms is received within at least one of the gaps between adjacent rollers; and a rotational actuator for rotating the turning assembly arms through an arc around the central position, whereby articles traveling along an article path on the conveyor are configured to either pass over at least one of the turning assembly arms or impact upon the at least one of the turning assembly arms depending upon whether the turning assembly is in an inactive or active position, respectively.

11. The apparatus of claim 10, wherein each of the arms includes:

a leading blade; and a trailing blade parallel but spaced from the leading blade by an amount approximately equal to a distance between gaps between adjacent rollers so that, when one of the arms is positioned orthogonal to a direction of travel of the conveyor and into the article path, the leading blade and trailing blade are capable of being lowered into gaps on either side of a single roller.

12. The apparatus of claim 11, wherein the leading blade and trailing blade are coupled together via a structural bridge located along a portion of a length of the blades, whereby one of the rollers includes a recessed portion adapted to receive the structural bridge when the turning assembly is lowered into its inactive position.

13. The apparatus of claim 10, wherein the conveyor is of a type having raised guides configured to maintain articles between the guides and within the expanse of the conveyor, the apparatus further being configured such that two of the arms align with a near one of the guides, one of the arms extends into the article path, and one of the arms extends away from the article path.

14. The apparatus of claim 10, wherein the vertical actuator and rotational actuator operate to raise and lower the turning assembly and rotate the turning assembly, respectively, responsive to a signal received from an upstream detector triggered by passage of the article along the article path of the conveyor.

15. A method for turning an article traveling on a conveyor, comprising:
   raising a first turning arm from within a gap between adjacent rollers on the conveyor to interpose the first turning arm into an article path along the conveyor, the rollers rotating about a roller axis of rotation orthogonal to a direction of movement of articles along the conveyor;
   receiving the article against the first turning arm as the article travels along the article path of the conveyor;
   rotating the first turning arm on an axis of rotation just outside the rollers, the turning arm axis of rotation being orthogonal to the roller axis of rotation, so that the article rotates along the conveyor with and moves past the first turning arm; and
   returning the first turning arm to a home position and lowering the first turning arm into the gap between adjacent rollers so that articles can pass over the first turning arm on the rollers.

16. A method for turning an article traveling on a conveyor, comprising:
   raising a first turning arm from within a gap between adjacent rollers on the conveyor to interpose the first turning arm into an article path along the conveyor;
   receiving the article against the first turning arm as the article travels along the article path of the conveyor;
   rotating the first turning arm on an axis of rotation just outside the rollers so that the article rotates along the conveyor with and moves past the first turning arm;
   returning the first turning arm to a home position and lowering the first turning arm into the gap between adjacent rollers so that articles can pass over the first turning arm on the rollers;
   arranging a second turning arm orthogonal to the first turning arm at the axis of rotation;
   raising a second turning arm with the first turning arm; and
   rotating the second turning arm in common with the first turning arm on the axis of rotation.

17. The method of claim 16, wherein the step of rotating the second turning arm in common with the first turning arm includes turning the first and second turning arms 90 degrees.

18. The method of claim 17, further comprising:
   arranging a third and fourth turning arm with the first and second turning arms to form a cross-shape arrangement with each arm orthogonal to an adjacent arm;
   raising the first, second, third, and forth arms in common; and
   rotating the arms in common on the axis of rotation.

19. The method of claim 18, wherein the step of rotating includes rotating the turning arms 90 degrees so that an edge of the first turning arm defines an edge of the conveyor and an orthogonal one of the remaining arms rotates into a position previously occupied by the first turning arm, and further including the step of lowering the orthogonal one of the remaining arms into the gap between adjacent rollers.

20. A method for turning an article traveling on a conveyor, comprising:
   raising a first turning arm from within a gap between adjacent rollers on the conveyor to interpose the first turning arm into an article path along the conveyor;
   receiving the article against the first turning arm as the article travels along the article path of the conveyor;
   rotating the first turning arm on an axis of rotation just outside the rollers so that the article rotates along the conveyor with and moves past the first turning arm;
   returning the first turning arm to a home position and lowering the first turning arm into the gap between adjacent rollers so that articles can pass over the first turning arm on the rollers;
   stopping the first turning arm after a rotation of less than 90 degrees so that the first turning arm is still interposed within the article path on the conveyor; and
   continuing movement of the conveyor while the first turning arm is stopped within the article path so that the article rotates around a terminal end of the first turning arm to a desired orientation.

* * * * *